United States Patent [19]
Goo

[11] Patent Number: 5,357,308
[45] Date of Patent: Oct. 18, 1994

[54] AUTOMATIC ZOOM CAMERA AND DRIVING METHOD THEREFOR

[75] Inventor: Bonjeong Goo, Kyeongsangnam-do, Rep. of Korea

[73] Assignee: Samsung Aerospace Industries, Inc., Kyeongsangnam-do, Rep. of Korea

[21] Appl. No.: 57,308

[22] Filed: May 5, 1993

[30] Foreign Application Priority Data

Nov. 6, 1992 [KR] Rep. of Korea ............... 92-20812

[51] Int. Cl.⁵ .................. G03B 5/00; G03B 13/36; G03B 15/05
[52] U.S. Cl. ................... 354/400; 354/412; 354/419; 354/127.1
[58] Field of Search ............ 354/400, 403, 195.1, 354/195.12, 195.13, 412, 266, 419–423, 413, 127.1

[56] References Cited

U.S. PATENT DOCUMENTS

| | | | |
|---|---|---|---|
| 4,777,508 | 10/1988 | Aoshima | 354/479 |
| 4,829,331 | 5/1989 | Aihara | 354/400 |
| 4,942,417 | 7/1990 | Miyazawa et al. | 354/400 |
| 5,119,122 | 6/1992 | Kudo et al. | 354/400 |

FOREIGN PATENT DOCUMENTS

0189981 8/1986 European Pat. Off.

Primary Examiner—W. B. Perkey
Attorney, Agent, or Firm—Francis C. Hand

[57] ABSTRACT

An automatic zoom camera and driving method therefor by which a user can take an optimal photograph, while controlling a zoom operation by synthetically controlling a shading of a picture and a change of colour varied in response to a zoom operation in accordance with a distance of an object, sensitivity of a film, environmental brightness and a brightness index of a strobe, while operating a zoom function. The automatic zoom camera is constituted by a switch block to sense information about an automatic zoom mode, a strobe mode, a sensitivity of film and a zoom position. In addition, the camera is able to sense the distance of an object via an infrared-emitting element and a light receiving element; information about an environmental brightness via a photoconductive cell; and a micro controller to minimize changes of colour and shading of a photograph in accordance with the distance of the object, the sensitivity of the film, the environmental brightness and a strobe brightness index, while automatically carrying out the zooming operation in case the operation mode is an automatic zoom mode. A flash driving circuit is used for compensating a lack of sufficient light by driving the strobe in response to an output signal of the micro controller; and a motor driving circuit and a shutter driving circuit for automatically adjusting a focus are driven for adjusting an exposure value, taking a photograph and advancing the film in response to the output signal of the micro controller.

9 Claims, 4 Drawing Sheets

AUTOMATIC ZOOM CAMERA AND DRIVING METHOD THEREFOR

BACKGROUND OF THE INVENTION

1. Field of the Invention

This invention relates to an auto zoom camera and driving method therefor. More particularly, this invention relates to an automatic zoom camera and driving method therefor by which a user can take an optimal photograph by synthetically controlling a shading of a picture and a varying change of colour in response to a zoom operation in accordance with a distance of an object, sensitivity of a film, environmental brightness and a brightness index of a strobe.

2. Description of the Prior Art

In order to make operation easy, generally middle class and low class cameras are made as automatic cameras with electronic circuits, such as a distance detecting means for automatically controlling the focus of a lens, a brightness detecting means and a shutter driving means for automatically controlling the exposure of film, a motor driving means for automatically controlling the transfer of the film and the movement of a lens group, a flash driving means for automatically compensating for a lack of sufficient light.

These automatic cameras have also been enhanced by mounting a zooming apparatus on the camera which is responsive to the request of a user. This allows the user to obtain have various visual angles while remaining still and to convert into a wide-angle lens or a telephoto lens by varying a focus distance of the lens.

As is known, the zooming apparatus of an ordinary automatic camera generally utilizes a lens block which can be moved back and forth within a body tube in order to provide for a wide-angle position and a telescopic position. However, this type of zooming apparatus has a disadvantage in that the user cannot obtain a photograph of a good quality due to changes of the colour and the shading of the picture when the user carries out the zoom function.

Korea Utility Model Publication No. 92-7904, filed on Dec. 18, 1992, and entitled with "Diaphragm Control Circuit in Response to Zoom Operation of a Video Camera", discloses a control circuit which can adequately control a diaphragm in response to a zoom operation of the camera to improve the abovementioned disadvantage of the changes of the colour and the shading of the image in case of zooming.

However, there is still a disadvantage in that the above-mentioned control circuit can not synthetically control the changes of the colour and the shading of the photograph during a zoom operation since this control circuit simply controls an exposure value by closing the diaphragm little by little as the zoom operation moves to a wide stage, namely, zooms out, and opening the diaphragm little by little as the zoom operation moves to a tele stage, namely, zooms in.

Also, there is an inconvenience in that the zooming apparatus of an automatic camera including the above-mentioned control circuit can not automatically set the zoom function.

SUMMARY OF THE INVENTION

Accordingly, it is an object of the invention to provide an automatic zoom camera and driving method therefor by which a user can take an optimal photograph by synthetically controlling a shading of a picture and a change of colour varied in response to a zoom operation in accordance with a distance of an object, sensitivity of a film, environmental brightness and a brightness index of a strobe, while operating a zoom function to overcome the above-mentioned disadvantage and inconvenience.

It is another object of the invention to be able to obtain a photograph of good quality during a zoom operation of an automatic zoom camera.

It is another object of the invention to provide a relatively simply circuit for adjusting the shading requirements for a photograph during a zoom operation of a zoom camera.

Briefly, the invention provides an automatic zoom camera which includes a switch block to sense information about an automatic zoom mode, a strobe mode, a sensitivity of film and a zoom position; a distance detecting means for sensing the distance of an object by an infrared-emitting element and a light receiving element; a brightness detecting means for sensing the information about an environmental brightness; a micro controller for charging a strobe, deciding whether a first release switch is turned ON, sensing a distance of an object, environmental brightness and a sensitivity of film in case the first release switch is turned ON, deciding whether a present operation mode is the automatic zoom mode, carrying out an automatic zoom processing subroutine to minimize changes of colour and shading of a photograph in accordance with the distance of the object, the sensitivity of the film, the environmental brightness and a strobe brightness index, deciding whether a second release switch is turned ON in case the present operation mode is not the automatic zoom mode or carrying out the automatic zoom processing subroutine, taking a photograph along with an automatic focus adjusting and an exposing operation in case said second release switch is turned ON, transferring the film after being photographed, and terminating all operations;

a flash driving means for compensating a lack of sufficient light by driving the strobe in response to an output signal of the micro controller; a shutter driving means for automatically adjusting a focus, adjusting an exposure value, and taking a photograph in response to the output signal of the micro controller; and a motor driving means for automatically controlling the transfer of the film and the movement of a lens group in response to the output signal of the micro controller.

A driving method for the automatic zoom camera comprises a step of initializing operation of the camera if power is applied; a step of charging a strobe; a step of deciding whether a first release switch is turned ON; a step of sensing a distance of an object, environmental brightness and a sensitivity of film in case the first release switch is turned ON; a step of deciding whether a present operation mode is an automatic zoom mode; a step of automatically carrying out a zoom operation in accordance with a distance of an object, an environmental brightness and a sensitivity of film in case of the automatic zoom mode; a step of calculating a zooming position and an exposure value; a step of deciding whether a second release switch is turned ON in case the present operation mode is not the automatic zoom mode or carrying out an automatic zoom processing subroutine; a step of taking a photograph along with an automatic focus adjusting in accordance with the previously calculated information signal and an exposing operation in case the second release switch is turned ON; a step of transferring the film after being photographed; and a step of terminating all operations.

BRIEF DESCRIPTION OF THE DRAWINGS

These and other objects of the invention will be become more apparent from the following description of a preferred embodiment of the best mode of carrying out the invention when taken in conjunction with the following drawings, wherein:

Referring to FIG. 1, the zooming apparatus of an ordinary automatic camera comprises a body tube 1, a body tube gear 2 united with the body tube 1; a driving gear 3; a body tube cam channel 4 formed around the body tube 1; a lens block 5 placed inside the body tube 1 to move coaxially relative thereto; and a fixing pin 6 united with the lens block 5 to move along the body tube cam channel 4. The pin 6 is further connected to a stationary part (not shown) of the camera.

Figure 1:
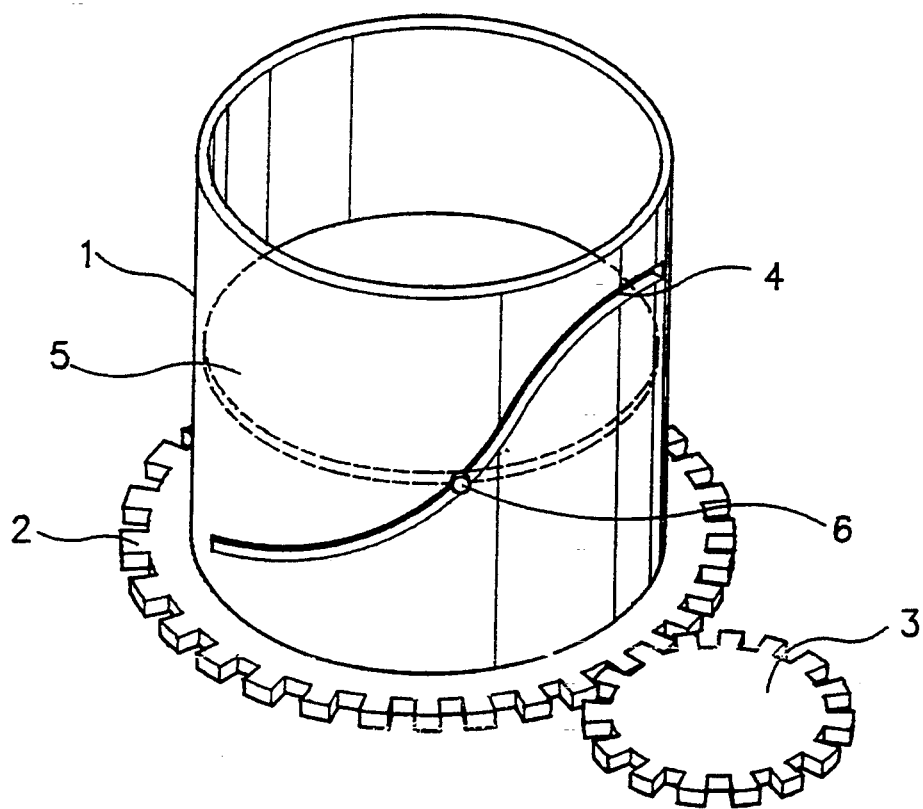
FIG. 1 is a schematic diagram of a zooming apparatus of an ordinary automatic camera.

The operation of the zooming apparatus is as follows.

If the driving gear 3 starts to rotate as a lens driving motor (not shown) rotates, the body tube gear 2 engaged with the driving gear 3 starts to rotate.

If the body tube gear 2 starts to rotate, the body tube 1 united with the body tube gear 2 starts to rotate. As the body tube 1 rotates, the fixing pin 6 moves along the body tube cam barrel 4 so that the lens block 5 connected with the fixing pin 6 moves forward and backward inside the body tube 1. The zoom function of the camera is provided by this movement of the lens block 5.

Here, for ease of illustration, one lens in the lens block is shown and explained. However, the lens block 5 of an actual camera comprises a plurality of lenses. Likewise, a plurality of body tube cam channels can be provided to move each respective lens block.

DESCRIPTION OF THE PREFERRED EMBODIMENT

Figure 2:
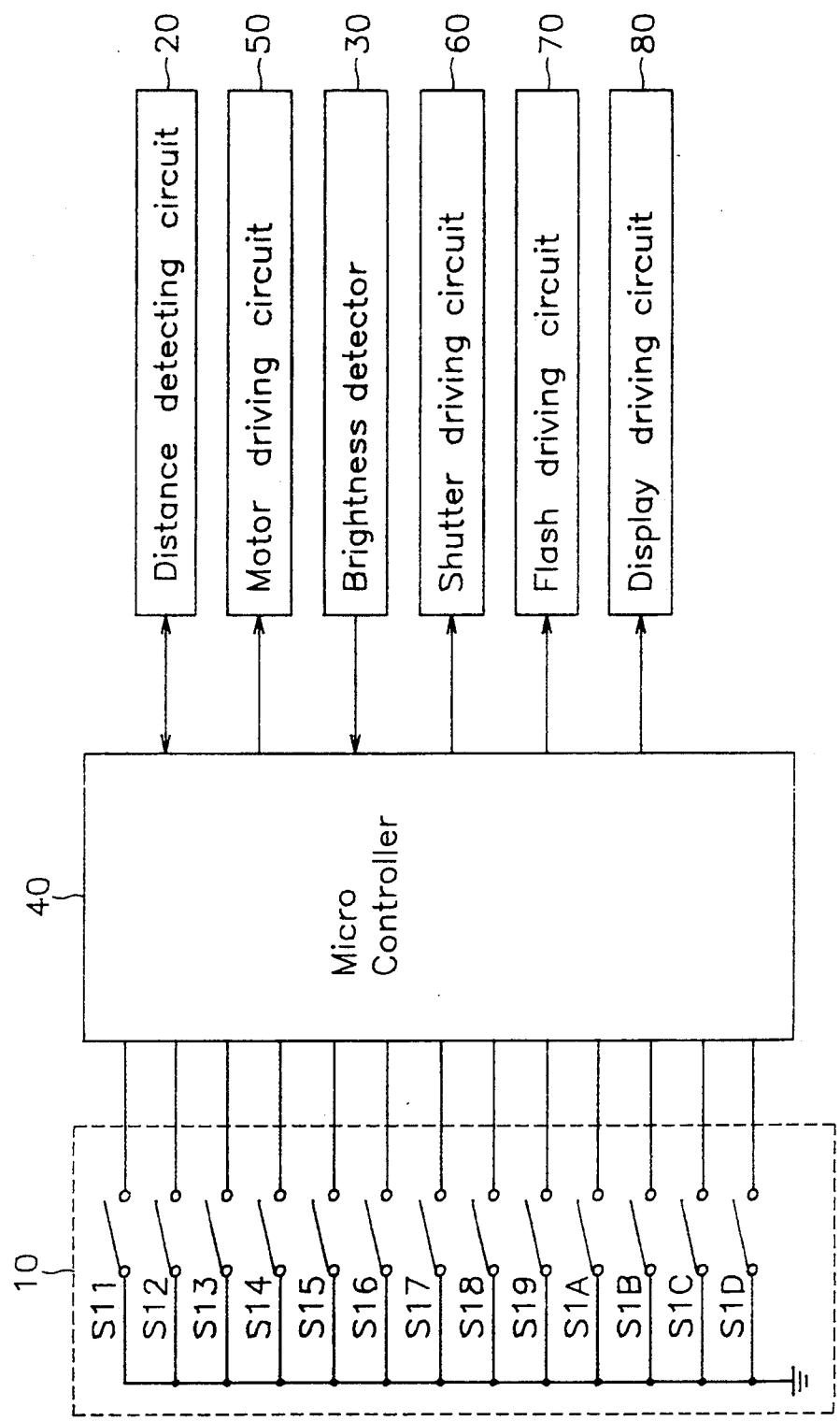
FIG. 2 is a block circuit diagram of an automatic zoom camera in accordance with an embodiment of the invention.

Referring to FIG. 2, an automatic zoom camera in accordance with one embodiment comprises a switch block 10; a distance detecting circuit 20 formed with an infrared-emitting element and a light receiving element; a brightness detecting circuit 30 formed with a photoconductive cell CdS; a micro controller 40 with input and output terminals connected to the distance detecting circuit 20 and with input terminals connected to the output terminals of the switch block 10 and the brightness detecting circuit 30; and a motor driving circuit 50 with an input terminal connected to an output terminal of the micro controller 40. The camera also has a shutter driving circuit 60, a flash driving circuit 70, and a display driving circuit 80, each of which is connected to an output terminal of the micro controller 40 as indicated.

The switch block 10 comprises a power control switch S11 connected between an earth and an input terminal of the micro controller 40; first and second release switches S12 and S13; four encoder switches S14-S17; strobe mode selection switches S18 and S19; an automatic zoom mode selection switch S1A; and three film sensitivity switches S1B-S1D.

Figure 3:
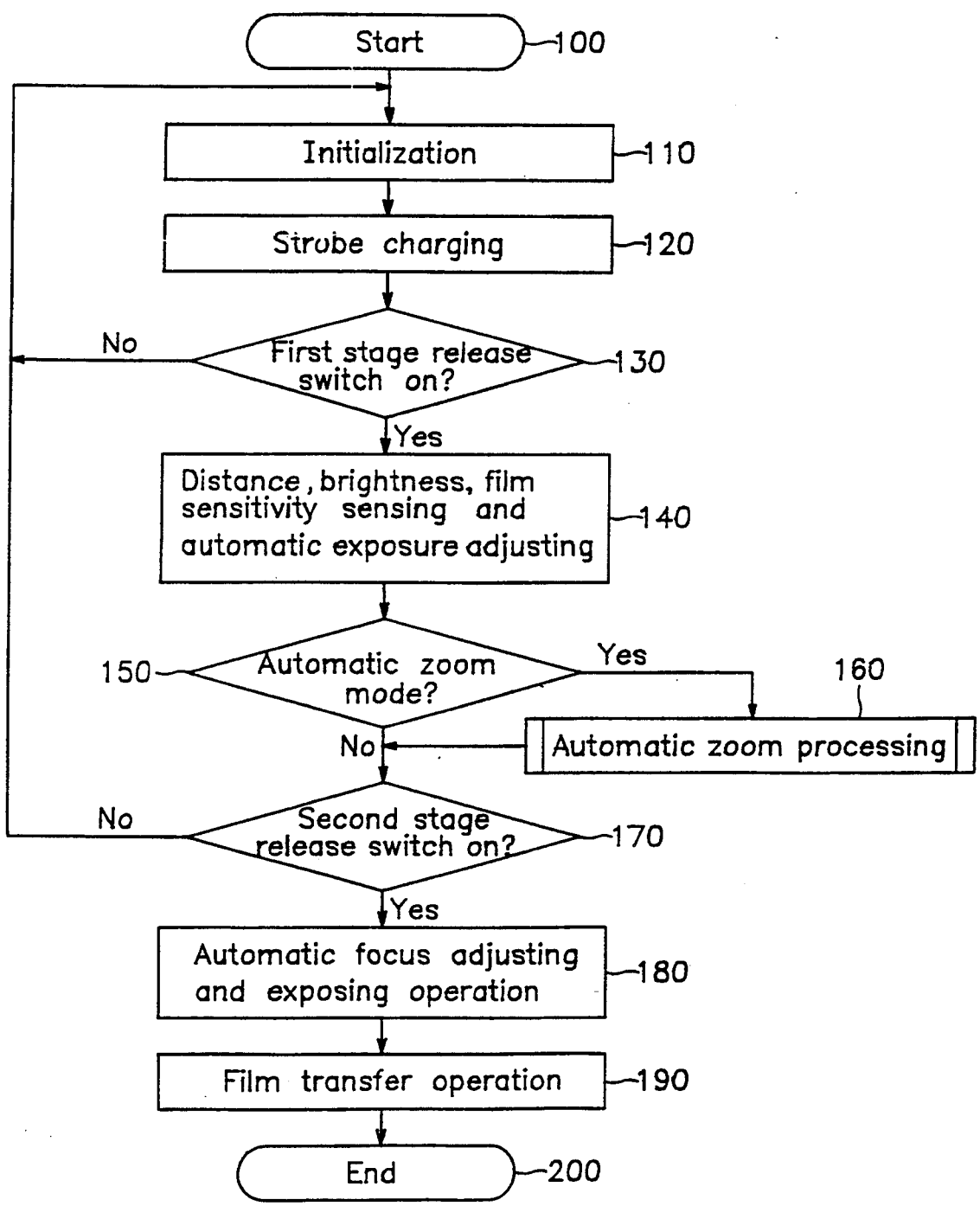
FIG. 3 is a flow diagram of the successive steps in an operation wholly illustrating a driving method for an automatic zoom camera in accordance with an embodiment of the invention.

Referring to FIG. 3, the operation of an automatic zoom camera comprises a step 100 of starting; a step 110 of initialization; a step 120 of charging a strobe; a step 130 of deciding whether a first release switch (S12, S13) is turned ON; a step 140 of sensing a distance of an object from the camera, environmental brightness and a sensitivity of film in case the first release switch S12 is turned ON; a step 150 of deciding whether a present operation mode is an automatic zoom mode; a step 160 of carrying out an automatic zoom processing subroutine in case of the automatic zoom mode; a step 170 of deciding whether a second release switch S13 is turned ON in case the present operation mode is in the automatic zoom mode or is carrying out the automatic zoom processing subroutine; a step 180 of taking a photograph including an automatic focus adjusting and exposing operation in case the second release switch is turned ON; a step 190 of transferring (i.e. advancing) the film after being photographed; and a step 200 of terminating all operations.

Figure 4:
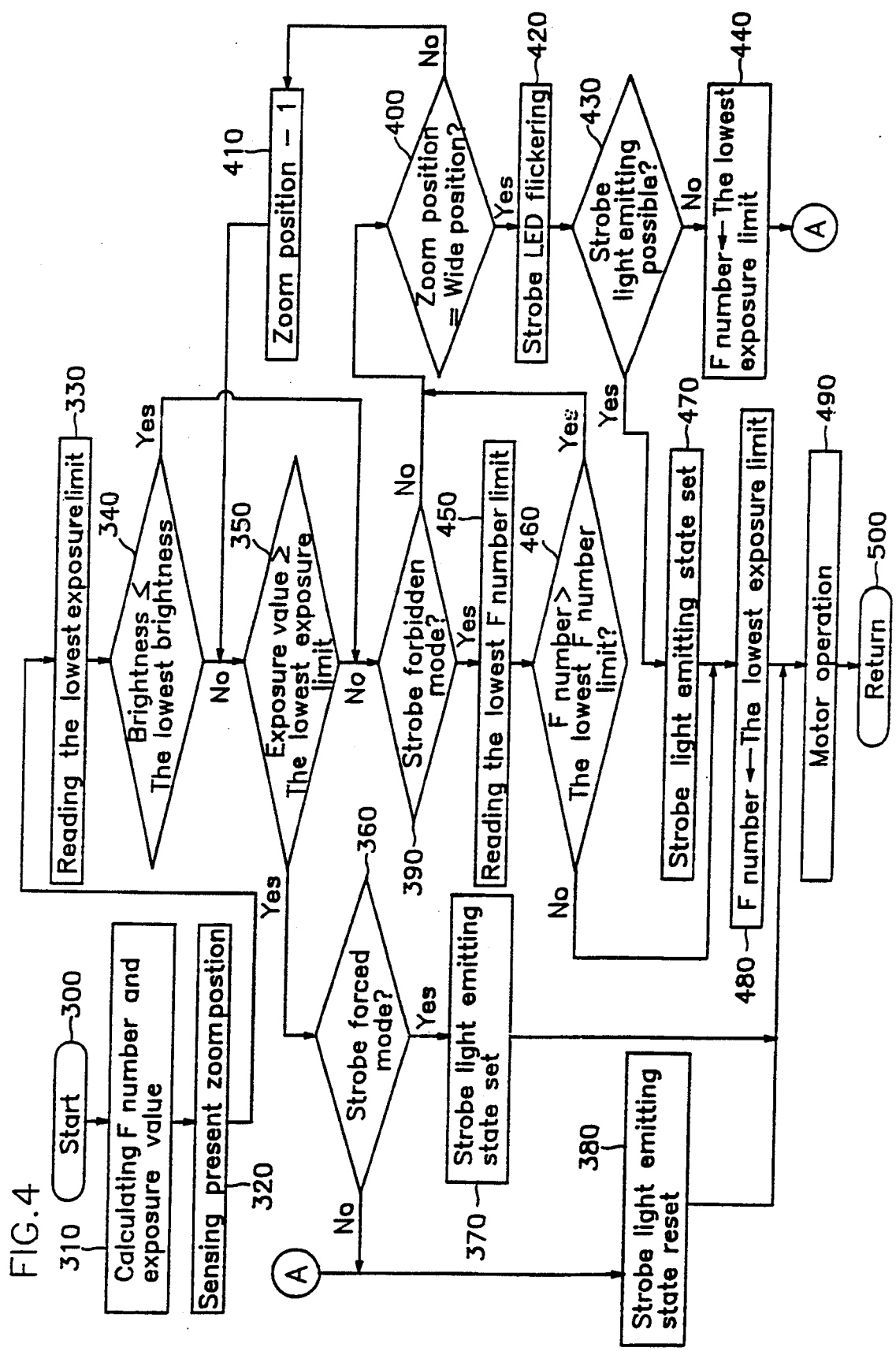
FIG. 4 is a flow diagram of the successive steps in an operation illustrating an automatic zoom processing subroutine of a driving method for an automatic zoom camera in accordance with an embodiment of the invention.

Referring to FIG. 4, the automatic zoom processing subroutine of the driving method for the automatic zoom camera comprises a step 300 of starting; a step 310 of calculating an F number and an exposure value; a step 320 of sensing a present position of a zoom lens; a step 330 of reading the lowest exposure limit; a step 340 of deciding whether the brightness is lower than a lowest brightness permitted and a step 350 of deciding whether the second exposure value is higher than the lowest exposure limit permitted in case the brightness is not lower than the lowest brightness.

The subroutine further includes a step 360 of deciding whether the present operation mode is a strobe forced mode in case the exposure value is higher than the lowest exposure limit; a step 370 of setting a strobe light emitting state flag in response to the strobe forced mode being activated; and a step 380 of resetting the strobe light emitting state flag in case the present operation mode is not the strobe forced mode.

The subroutine also includes a step 390 of deciding whether the present operation mode is a strobe forbidden mode in case the exposure value is lower than the lowest exposure limit; a step 400 of deciding whether the zoom position exists in a wide-angle position in case the present operation mode is not the forbidden mode; a step 410 of reducing the zoom position in case the zoom position does not exist in the wide-angle position; a step 420 of flickering a strobe LED in case the zoom position is in the wide-angle position; a step 430 of deciding whether the light emitting of the strobe is possible; and a step 440 of substituting the lowest exposure limit for the exposure value in case the light emitting of the strobe is not possible.

The subroutine also includes a step 450 of reading the lowest F number in case the strobe is in the forbidden mode; a step 460 of deciding whether the read F number is greater than the lowest F number limit; a step 470 of setting the strobe light emitting state flag in case the strobe is able to emit light; a step 480 of substituting the lowest exposure limit for the exposure value in case the F number is smaller than the lowest F number limit; a step 490 of varying a focus distance by driving a motor, for example, for moving a lens block 5 in a body tube 1 as indicated in FIG. 1; and a step 500 of returning.

The operation of the automatic zoom camera and driving method therefor is as follows:

If the power control switch S11 in the switch block 10 is turned ON, the automatic zoom camera starts to operate.

If the automatic zoom camera operates, the micro controller 40 (see FIG. 2) initializes an internal memory (step 110) and all electronic circuits, and charges the strobe (not shown) (step 120) through a flash driving circuit 70.

At the same time, the micro controller 40 decides whether the first stage release switch S12 in the switch block 10 is turned ON (Step 130).

If the first stage release switch S12 in the switch block 10 is turned ON, the micro controller 40 senses an information signal about the distance of the object by driving the distance detecting circuit 20, senses the information signal about the sensitivity of the film via the film sensitivity switches S1B-S1D in the switch block 10, senses the brightness information signal about the environmental brightness via the brightness detecting circuit 30, and saves the information in an internal memory (Step 140).

Next, the micro controller 40 decides whether the present operation mode is the automatic zoom mode (Step 150) via the automatic zoom mode selection switch S1A in the switch block 10.

In case the present operation mode is the automatic zoom mode, the micro controller 40 carries out the automatic zoom processing subroutine (Step 160) (as indicated in FIGS. 3 and 4), and decides whether the second stage release switch S13 is turned ON (Step 170). Also, in case the present operation mode is not the automatic zoom mode, the micro controller 40 decides whether the second stage release switch S13 in the switch block 10 is turned ON right away without carrying out the automatic zoom processing subroutine.

If the second stage release switch S13 in the switch block 10 is turned ON, the micro controller 40 automatically adjusts the focus, decides the exposure value, and takes a photograph (Step 180) by operating the motor driving circuit 50, the shutter driving circuit 60 and the flash driving circuit 70 in response to the information signal about the present sensed distance of the object, the information signal about the environmental brightness and the information signal about the sensitivity of the film.

If the photographing is finished, the micro controller 40 advances the film (Step 190) via the motor driving circuit 50, and terminates all operations.

In case the automatic zoom mode is selected in the above operation, the operation of the automatic zoom processing subroutine which the micro controller 40 carries out is as follows.

If the user turns ON the automatic zoom mode selection switch S1A in case the user wants to operate in the automatic zoom mode, the micro controller 40 senses this operation and carries out the automatic zoom processing subroutine.

If the automatic zoom processing subroutine is started, the micro controller 40 reads from the internal memory the information signal about the distance of the object sensed by the distance detecting circuit 20, the brightness information signal about the environmental brightness sensed by the brightness detecting circuit 30 and the information signal about the sensitivity of the film sensed from the film sensitivity switches S1B-S1D in the switch block 10. And, thus, the micro controller 40 calculates the F number and the exposure value in response to the above-mentioned information signals.

The F number and the exposure value calculated by the micro controller 40 are decided by the following formulas.

The $F$ number = the value about the distance of the object + the value about the sensitivity of the film

The exposure value = the value about the environmental brightness + the value about the sensitivity of the film In accordance with the above formula, a large F number means that the object is far away or the sensitivity of the film is large, and a large exposure value means that the environmental brightness is high or the sensitivity of the film is high.

Next, the micro controller 40 senses the present zoom position (Step 320) via the encoder switches S14-S17 in the switch block 10, and reads the lowest exposure limit (Step 330) from the internal memory in accordance with the present zoom position.

The micro controller 40 (step 340) decides whether the environmental brightness from the brightness information signal is smaller than the lowest brightness. If the environmental brightness is smaller than the lowest brightness, this means a dark state for which an auxiliary light source is necessary. If the environmental brightness is larger than the lowest brightness, this means a bright state in which photographing is possible without driving the strobe.

The micro controller 40 (Step 350) decides whether the exposure value is larger than the lowest exposure limit in case the environmental brightness is larger than the lowest brightness. The sensitivity of the film is good in case the brightness is larger than the lowest brightness and the exposure value is larger than the lowest exposure limit, and the sensitivity of the film is not good in case the brightness is larger than the lowest brightness and the exposure value is smaller than the lowest exposure limit.

Next, the micro controller 40 (Step 360) decides whether the present operation mode is the forced strobe mode via the strobe mode selection switches S18 and S19 in the switch block 10 in case the brightness is larger than the lowest brightness and the exposure value is larger than the lowest exposure limit. The forced strobe mode is the mode which the user always wants to drive regardless of the environmental brightness or the sensitivity of the film.

Accordingly, the micro controller 40 makes the strobe emit the light unconditionally by setting a flag signal about the strobe light emitting state in case the operation mode is the forced strobe mode. However, the micro controller 40 does not make the strobe emit the light by resetting the flag signal about the strobe light emitting state in case the operation mode is not the forced strobe mode.

The user has to drive the strobe in case the brightness is smaller than the lowest brightness, or the brightness is larger than the lowest brightness but the exposure value is smaller than the lowest exposure limit, since the environmental brightness is too dark and the sensitivity of the film too low. In this case, the micro controller 40 decides whether the operation mode is the strobe forbidden mode via the strobe mode selection switches S18 and S19 in the switch block 10. The strobe forbidden mode is the mode in which the user does not always operate the strobe regardless of the environmental brightness and the sensitivity of the film.

The micro controller 40 decides (Step 400) whether the present zoom position exists in the wide-angle position via the encoder switches S14-S17 in the switch block 10 in case the operation mode is not the strobe forbidden mode. The micro controller 40 reduces the zoom position (Step 410) by operating the motor driving circuit 50, and automatically zooms for the zoom position to be placed in the wide-angle position in case the zoom position does not exist in the wide-angle position. Therefore, the zoom operation of the lens is automatically transferred by the micro controller 40 to the position where the distance of the focus is short in case the environmental brightness is dark or the sensitivity of the film is not good.

If the micro controller 40 senses that the zoom position exists in the wide-angle position via the encoder switches S14-S17 in the switch block 10, the micro controller 40 informs the user the strobe is in the operation state by flickering the strobe LED (Step 420) through a display driving circuit 80 (FIG. 2), and decides (Step 430) whether the light emitting is possible after the charging is finished.

In the above-mentioned case, the micro controller 40 substitutes the exposure value for the lowest exposure limit, and resets the strobe light emitting state flag in case the strobe has to be operated but the strobe can not emit the light due to not being charged. But, in case the strobe can emit the light, the micro controller 40 substitutes the exposure value for the lowest exposure limit, setting the strobe light emitting state flag. Accordingly, the user can assume that the strobe is not charged in case the strobe does not emit the light, even though the strobe LED is flickering.

The micro controller 40 reads the lowest F number limit (Step 450) from the internal memory and decides (Step 460) whether the F number is larger than the lowest F number limit in case the user sets the operation mode to the strobe forbidden mode, even though the strobe has to be operated.

In case the F number is larger than the lowest F number limit, namely, the distance of the object is far away or the sensitivity of the film is not good, the micro controller 40 places the zoom position to the wide-range position, and in case the strobe can emit the light, the micro controller 40 sets the strobe light emitting state flag while substituting the exposure value for the lowest exposure value.

In case the F number is smaller that the lowest F number limit, the micro controller 40 substitutes the exposure value for the lowest exposure limit.

Next, in case the focus is less than as calculated by the formula, namely, "focus<((distance of the object-×maximum aperture of the diaphragm)÷(strobe brightness index) in accordance with the strobe brightness index), the micro controller 40 controls the focus to satisfy this formula, namely, "focus >((distance of the object x maximum aperture of the diaphragm)÷(strobe brightness index)).

Also, the micro controller 40 sets the open time of the shutter to satisfy this formula, namely, "shutter open time≦focus distance of zoom lens" in response to the change of the focus distance.

After the automatic zoom processing subroutine is carried out, if the second stage release switch S13 in the switch block 10 is turned ON, the micro controller 40 automatically controls the focus (Step 180), decides the exposure value and takes the photograph by operating the motor driving circuit 50, the shutter driving circuit 60 and the flash driving circuit 70 in response to the information signal set in the automatic zoom processing routine.

If the photographing is finished, the micro controller 40 makes the film advance through the motor driving circuit 50, and terminates all operations.

The invention provides an automatic zoom camera and driving method therefor by which a user can take an optimal photograph. In this respect, the zoom operation of the camera is controlled by synthetically controlling a shading of a picture and a change of colour varied in response to a zoom operation in accordance with a distance of an object, sensitivity of a film, environmental brightness and a brightness index of a strobe, while operating a zoom function.

What is claimed is:

1. An automatic zoom camera comprising:
    a switch block to sense information about an automatic zoom mode, a strobe mode, a sensitivity of film and a zoom position;
    a distance detecting means for sensing the distance of an object;
    a brightness detecting means for sensing the information about an environmental brightness;
    a micro controller for charging a strobe, deciding whether a first release switch is turned ON, sensing a distance of an object, environmental brightness and a sensitivity of film in case the first release switch is turned ON, deciding whether a present operation mode is the automatic zoom mode, carrying out an automatic zoom processing subroutine to minimize changes of colour and shading of a photograph in accordance with the distance of the object, the sensitivity of the film and deciding whether a second release switch is turned ON in case the present operation mode is not the automatic zoom mode or carrying out the automatic zoom processing subroutine, taking a photograph along with an automatic focus adjusting and an exposing operation in case said second release switch is turned ON, transferring the film after being photographed, and terminating all operations;
    a flash driving means for compensating a lack of sufficient light by driving a strobe in response to an output signal of the micro controller;
    a shutter driving means for automatically adjusting a focus, adjusting an exposure value, and taking a photograph in response to the output signal of the micro controller; and
    a motor driving means for automatically controlling the transfer of the film and the movement of a lens group in response to the output signal of the micro controller.

2. A driving method for an automatic zoom camera comprising the steps of;
    applying power to initialize operation;
    charging a strobe;
    deciding whether a first release switch is turned ON;

sensing a distance of an object, environmental brightness and a sensitivity of film in case the first release switch is turned ON;

deciding whether a present operation mode is an automatic zoom mode;

carrying out an automatic zoom processing subroutine in case of the automatic zoom mode;

deciding whether a second release switch is turned ON in case the present operation mode is not the automatic zoom mode or carrying out the automatic zoom processing subroutine;

taking a photograph along with an automatic focus adjusting and an exposing operation in case said second release switch is turned ON;

transferring the film after being photographed; and terminating all operations.

3. A driving method for an automatic zoom camera as set forth in claim 2, wherein said automatic zoom processing subroutine comprises steps of:

calculating an F number and an exposure value sensing a present position of a zoom;

reading a lowest exposure limit;

deciding whether the brightness is lower than a lowest brightness;

deciding whether the exposure value is higher than the lowest exposure limit in case the brightness is not lower than the lowest brightness;

deciding whether the present operation mode is a strobe forced mode in case the exposure value is higher than the lowest exposure limit;

setting said strobe light emitting state flag in case of the strobe forced mode;

resetting a strobe light emitting state flag in case the present operation mode is not the strobe forced mode;

deciding whether the present operation mode is a strobe forbidden mode in case the exposure value is lower than the lowest exposure limit;

deciding whether the zoom position exists in a wide-range position in case the present operation mode is not the forbidden mode;

reducing the zoom position in case the zoom position does not exist in the wide position;

flickering a strobe display in case the zoom position exists in the wide-range position;

deciding whether light emitting of the strobe is possible;

substituting the lowest exposure limit for the exposure value in case the light emitting of the strobe is not possible;

reading a lowest F number in case the strobe is in the forbidden mode;

deciding whether an F number is larger than the lowest F number limit;

setting a strobe light emitting state flag in case the light emitting of the strobe is possible;

substituting the lowest exposure limit and for the exposure value in case the F number is smaller than the lowest F number limit;

varying a focus distance by driving a motor.

4. A driving method for an automatic zoom camera as set forth in claim 3, wherein said zoom position is set to the formula, "focus$\geq$((distance of the object x maximum aperture of the diaphragm)$\div$(strobe brightness index))" in said subroutine.

5. An automatic zoom camera comprising:

a strobe light;

a switch block to sense information about an automatic zoom mode, a strobe mode, a sensitivity of film and a zoom position;

a distance detecting means for sensing the distance of an object;

a brightness detecting means for sensing environmental brightness;

a micro controller to minimize changes of colour and shading of a photograph in accordance with the distance of the object, the sensitivity of the film, the environmental brightness and a strobe brightness index, while automatically carrying out a zooming operation;

a flash driving means for driving said strobe in response to an output signal of said micro controller to compensate for a lack of sufficient light; and a shutter driving means for adjusting an exposure value and taking a photograph in response to an output signal of said micro controller.

6. A driving method for an automatic zoom camera comprising the steps of charging a strobe in response to activation of the camera;

sensing operation of a first release switch;

sensing a distance of an object, environmental brightness and a sensitivity of film in response to operation of the first release switch;

carrying out an automatic zoom processing subroutine in dependence on the distance, brightness and film sensitivity during an automatic zoom mode of the camera to control the shading of a photograph;

sensing operation of a second release switch after completion of said subroutine; and taking a photograph along with an automatic focus adjusting and exposing operation in response to operation of said second release switch.

7. A method as set forth in claim 6, wherein said automatic zoom processing subroutine comprises steps of:

calculating an F number and an exposure value;

sensing a present position of a zoom;

reading a lowest exposure limit;

deciding whether the brightness is lower than a lowest brightness;

deciding whether the exposure value is higher than the lowest exposure limit in case the brightness is not lower than the lowest brightness; and setting a strobe light to a light emitting state in response to said exposure value being higher than the lowest exposure limit.

8. An automatic processing subroutine comprising the steps of calculating an F number and an exposure value;

sensing a present position of a zoom;

reading a lowest exposure limit;

deciding whether the brightness is lower than a lowest brightness;

deciding whether the exposure value is higher than the lowest exposure limit in case the brightness is not lower than the lowest brightness; and setting a strobe light to a light emitting state in response to said exposure value being higher than the lowest exposure limit.

9. A method as set forth in claim 8 wherein said F number equals a value about the distance of an object to be photographed plus a value about the sensitivity of the film to be exposed and said exposure value equals a value about the environmental brightness plus the value about the sensitivity of the film.

* * * * *